(12) United States Patent
Sanicola

(10) Patent No.: US 7,245,209 B2
(45) Date of Patent: Jul. 17, 2007

(54) U-TURN INDICATOR

(76) Inventor: Joseph Douglas Sanicola, 1123 Saga St., Glendora, CA (US) 91741

( * ) Notice: Subject to any disclaimer, the term of this patent is extended or adjusted under 35 U.S.C. 154(b) by 182 days.

(21) Appl. No.: 11/084,370

(22) Filed: Mar. 18, 2005

(65) Prior Publication Data

US 2005/0168347 A1 Aug. 4, 2005

Related U.S. Application Data

(63) Continuation-in-part of application No. 10/602,842, filed on Jun. 24, 2003, now abandoned.

(51) Int. Cl.
*B60Q 1/34* (2006.01)
(52) U.S. Cl. ............... 340/475; 340/465; 340/476
(58) Field of Classification Search ........... 340/465, 340/475, 476, 477, 478, 468; 701/201, 211
See application file for complete search history.

(56) References Cited

U.S. PATENT DOCUMENTS

| | | | | |
|---|---|---|---|---|
| 4,994,786 A | * | 2/1991 | Schaffer | 340/478 |
| 5,003,289 A | * | 3/1991 | Roman | 340/475 |
| 5,086,289 A | * | 2/1992 | Sullivan et al. | 340/475 |
| 5,654,892 A | * | 8/1997 | Fujii et al. | 701/211 |
| 5,731,755 A | * | 3/1998 | Boxer | 340/465 |
| 6,043,740 A | * | 3/2000 | Tan | 340/475 |

FOREIGN PATENT DOCUMENTS

JP 2000062527 A * 2/2000

* cited by examiner

*Primary Examiner*—Van T. Trieu
(74) *Attorney, Agent, or Firm*—Christie, Parker & Hale, LLP

(57) ABSTRACT

A U-turn indicator for motor vehicles having a light fixture housing and a plurality of light sources located therein. The housing is divided into a U-turn indicating region and a non-U turn indicating region, and the plurality of light sources located in the U-turn indicating region are lightable separately from the plurality of light sources in the non-U turn indicating region. The light fixture housing forms a light fixture housing for one of a left and right turn signal indicator on a front and rear of a automobile. The light fixture functions as one of a left and right turn signal indicator when the plurality of light sources in both the U-turn indicating region and the non-U turn indicating region are activated, and as a U turn indicator when only the plurality of light sources in the U-turn indicating region are activated.

18 Claims, 3 Drawing Sheets

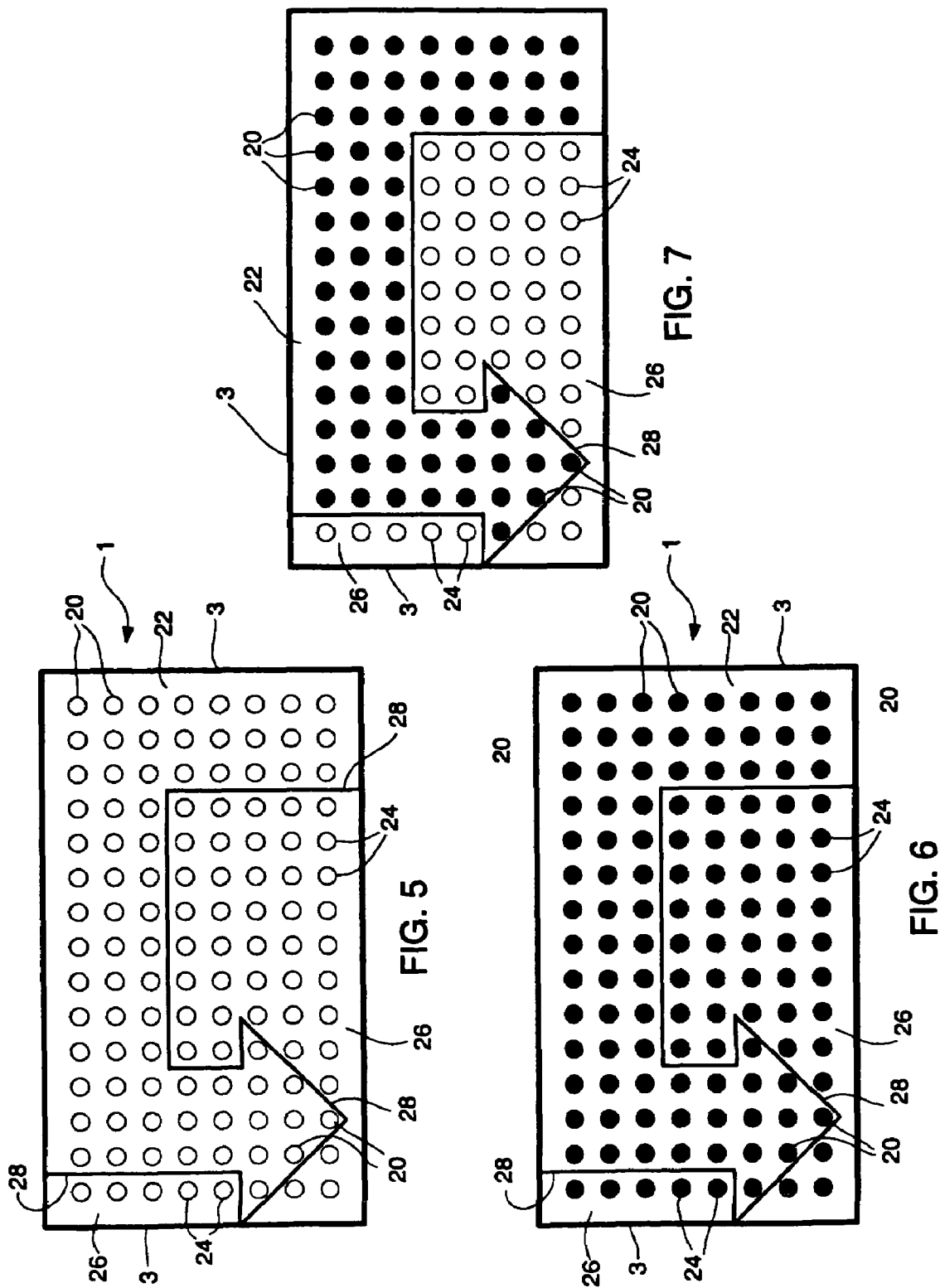

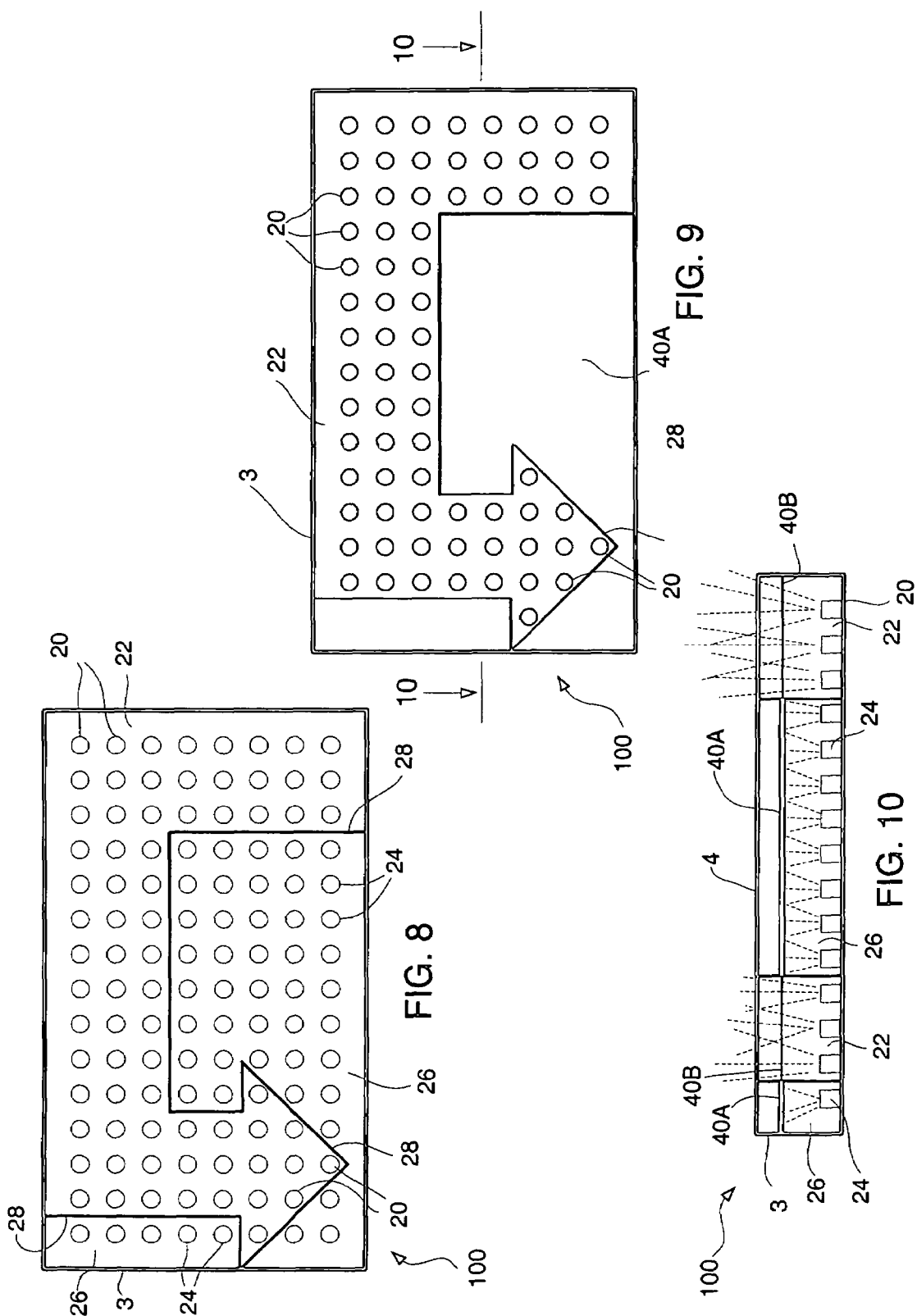

U-TURN INDICATOR

CROSS-REFERENCE TO RELATED APPLICATION(S)

This is a continuation-in-part of application Ser. No. 10/602,842, filed Jun. 24, 2003 now abandoned.

BACKGROUND

This invention relates to the field of turn signal indicators for motor vehicles, more particularly to a U-turn indicator for motor vehicles.

All motor vehicles are equipped with turn signaling equipment, which typically consist of blinking lights positioned on the front and rear corners of an automobile. More recently, some motor vehicles position blinking lights on side panels and/or on rear-view mirrors to provide a further indication of when a turn is about to be made. However, such turn signal indicators do not provide any special signal that a driver is planning to execute a U-turn.

There are numerous U-turn indicators disclosed in the literature which include dedicated signal lights which are placed on the back and front of a car, and available as after-market products. However, these products are not necessarily well integratable into the design of current motor vehicles and their turn signal indicating lamp fixtures.

Accordingly, there remains a need for an improved U-turn signal indicating apparatus.

BRIEF DESCRIPTION

The invention provides a U-turn indicating device that is adaptable to be included as a manufacturer's original equipment in a motor vehicle and it is adapted for inclusion in a conventional turn signal indicator lamp fixture. The U-turn signal indicator can comprise a plurality of small light sources, such as LEDs, small halogen lamps, optical fiber lights by some means, or any other light sources presently existing or in the future developed. During normal operation of a turn signal, all the lights will be repeatedly flashed on and off at the appropriate sequence to signal that a turn is being made. During non-operation of a turn signal fixture, the light sources will not be energized and no flashing light will be output. However, when a user wishes to signal that a U-turn is being executed, only a certain number of the light sources will be energized, creating a distinct pattern, e.g., a generally U-shaped arrow. The lights in the arrow can be flashed rapidly and/or can be energized in a certain order to create a pulsating moving arrow appearance, if desired. Additional features, such as sound, can be used in conjunction with the light to make the turn signal more prominent. While single colored LEDs can be used, it is possible to use multi-colored LEDs such that when a U-turn is to be executed, the LEDs can be energized in a different color than a normal turn signal. It is also contemplated utilizing the light sources in a housing of a brake light.

BRIEF DESCRIPTION OF THE DRAWINGS

The invention is further described with reference to the figures in which:

FIG. 5 is a top view of an exemplary U-turn indicator of the invention in its unlit state;

FIG. 6 is a view of the U-turn indicator of FIG. 5 with all light sources lit;

FIG. 7 is a top plan view of the U-turn indicator fixture of FIG. 5 with selected light sources lit to form a distinct signaling shape;

FIG. 8 is a top view of an another exemplary U-turn indicator of the invention in its unlit state;

FIG. 9 is a top plan view of the U-turn indicator fixture of FIG. 8 with some light sources blocked to thereby form a distinct signaling shape.

FIG. 10 is a cross sectional view through lines 10-10 of FIG. 9 and shows a light blocking layer.

DETAILED DESCRIPTION

Figure 1:
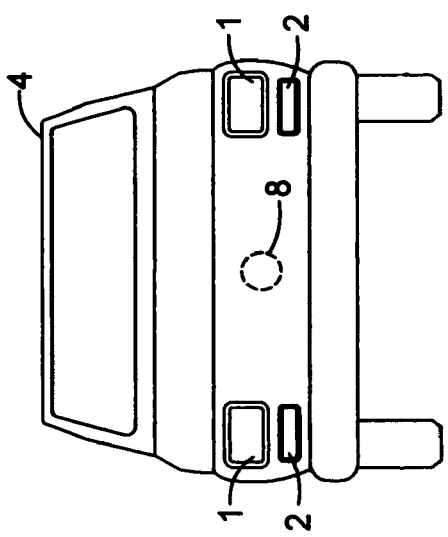
FIG. 1 is a diagrammatic rear view of a automobile fitted with light fixtures at its left and right corners and a sound generator.

Referring now to the figures, FIG. 1 shows a diagrammatic view of a motor vehicle 4. The motor vehicle has an upper light fixture 1 and a lower light fixture 2 and an optional sound generator 8 located on the body thereof. For purposes of signaling that a U-turn is about to take place, there will preferably be U-turn signal indicators (e.g., light fixture 1) on the driver's side front and rear corner of the motor vehicle. Obviously, for countries where drivers drive on the right side of the road, the driver's side will be the left side of the motor vehicle and vice-versa for nations in which drivers drive on the left side of the road.

Figure 2:
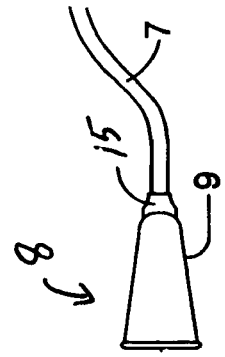
FIG. 2 is a close up view showing two light fixtures of the automobile of FIG. 1.

Referring to FIG. 2, there is shown an exemplary view of the light fixtures 1 and 2 of FIG. 1.

Figure 3:
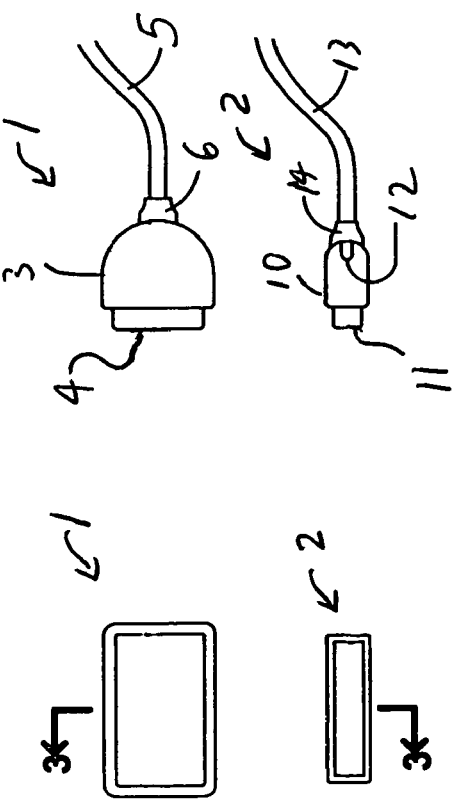
FIG. 3 is a cross-sectional view through view lines 3-3 of FIG. 2. showing the two light fixtures.
Figure 4:
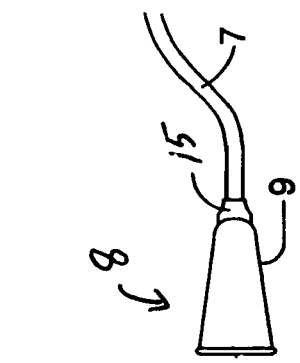
FIG. 4 is a side view showing the optional sound generator.

FIG. 3 is a side view shown through view lines 3-3 of FIG. 2 of light fixtures 1 and 2. Light fixture 1 has a light fixture body 3 and an optional lens cover 4 and is supplied by power via power line 5 to an interface 6 between the light fixture body 3 and the power line 3. Light fixture 2 has a similar structure as light fixture 1 and has a light fixture body 10 with a lens cover 11 having a single light source or bulb 12 supplied by a power line 13 which connects via an interface 14 to the light fixture housing 10. Referring to FIG. 4, there is shown a side view of the sound generator 8 which is housed in a sound generator body 9. A sound generating power source 7 connects to the sound generating body 9 by interface region 15.

Referring now to FIG. 5, there is shown an exemplary embodiment of the U-turn indicating light fixture 1 which has a plurality of light sources 20 which are located in a first area, depicted as a generally U-shaped region 22, and a plurality of light sources 24 located in second area, shown as a generally confined area 26 of a light fixture. A dividing wall 28 can optionally be used to separate light sources 24 from 20, the function of which will be described further below. These individual light sources 20 and 24 can comprise LEDs or other light sources including incandescent lamps or any other presently available or in the future developed light sources. The light sources 20 and 24 and the dividing wall 28 can be located in the light fixture housing 3. In FIG. 5, the individual light sources 20 and 24 are not illuminated, which will be the condition when neither the U-turn indicator function nor the conventional turn signal indicator is being utilized.

FIG. 6 is a front view of the U-turn indicating light fixture of FIG. 5, but with all the light sources 20 and 24 illuminated. In situations where the U-turn indicator is incorporated into a brake light assembly, this would correspond to the state where brake lights are applied. In situations where the U-turn indicator is incorporated into a front and rear left turn indicator lamp (for driving on the right side of the road countries), this corresponds to moments when the turn signal indicator is flashing.

Lastly, turning to FIG. 7, there is shown a front view where the light sources in region 22 are illuminated, thereby forming a desired pattern, here shown as a generally U-shaped arrow. Although FIG. 7 shows a generally "squarish" downwardly and left pointing arrow, other shapes and designs can be utilized. As shown, the light sources 24 in region 26 are not illuminated so that the U-shaped arrow is very apparent. The dividing walls 28 can be optionally included to further define the shape of the U-turn indicator symbol, but need not be included if the individual light sources will provide a clear enough visual indication without providing the additional divider walls to prevent light leaking to other areas of the light fixture.

Although FIG. 7 shows a particular arrow shape, other shapes can be used including a simple upside down U-shape without an arrow head. In addition, the individual light sources in the generally u-shaped region 22 can be energized to sequentially have a moving arrow appearance, or, the light sources can be flashed and/or can be of the type that have a different color when energized differently, thereby creating a different color arrow.

Turning to FIGS. 8-10, there are shown views of another embodiment of the U-turn indicator, wherein a light blockable shield 40, such as including an electrochromic film that darkens in areas 40A when a current is applied, is located above the light sources, thereby acting as a light blocking shield so that only the light of the light sources 20 will escape and be released. The shield can have areas 40B which are not darkened, and therefore allow light to be transmitted therethrough. In other aspects, the construction of the light fixture can be the same as with the design shown in FIGS. 5-7. With such a design, it is possible to use a single light source, rather than the plurality of light sources shown.

Accordingly, the invention at the functionality of a U-turn indicator to motor vehicles without necessitating the addition of another lamp fixture on the automobile. The U-turn indicator function can be operated by an additional setting on the control stem for the left and right turn indicator lamps or could be provided as an accessory button to be operated when the U-turn is to be executed.

It is to be understood that the invention is not limited in its application to the details and construction and arrangements of components set forth in the above description or illustrations and drawings. The invention is capable of other embodiments that are being practiced and carried out in various ways. It is also to be understood that the phraseology and terminology employed herein is for the purpose of description and should not regarded as limiting.

What is claimed is:

1. A U-turn indicator for motor vehicles, comprising:
   a plurality of light sources which are divided into a U-turn indicating group and a non-U turn indicating group, wherein the plurality of light sources in the U-turn indicating group are lightable separately from the plurality of light sources in the non-U turn indicating group, and wherein the light sources in the U-turn indicating group have one color when functioning for U-turn indicating, and a different color, which is the same as the light sources in the non U-turn indicating group, when the light sources in the U-turn indicating group are functioning as turn signal indicator light sources.

2. The U-turn indicator of claim 1, wherein the plurality of light sources in at least the U-turn indicating group comprise LED lights.

3. The U-turn indicator of claim 1, further comprising a light fixture housing in which the plurality of light sources are located.

4. The U-turn indicator of claim 1, further comprising separators for the plurality of light sources in the U-turn indicating group and the plurality of light sources in non-U turn indicating group.

5. The U-turn indicator of claim 4, wherein the separators comprise walls which define a desired outline.

6. The U-turn indicator of claim 1, wherein the plurality of light sources in the U-turn indicating group at least one of flash, pulsate, and sequentially light up to imply movement.

7. The U-turn indicator of claim 1, wherein the U-turn indicating region is generally U-shaped.

8. The U-turn indicator of claim 1, further comprising a noise generator to signal that a U-turn is going to be made.

9. The U-turn indicator of claim 1, wherein the U-turn indicator is provided as original equipment in an automobile.

10. The U-turn indicator of claim 1, wherein the plurality of light sources in at least the U-turn indicating region comprise LED lights.

11. A U-turn indicator for motor vehicles, comprising:
    a plurality of light sources which are divided into a U-turn indicating group and a non-U turn indicating group, wherein the plurality of light sources in the U-turn indicating group are lightable separately from the plurality of light sources in the non-U turn indicating group, wherein the light fixture housing comprises a light fixture housing for one of a left and right turn signal indicator on a front and rear of a automobile, and wherein the light fixture functions as one of a left and right turn signal indicator when the plurality of light sources in both the U-turn indicating group and the non-U turn indicating group are activated, and as a U turn indicator when only the plurality of light sources in the U-turn indicating group are activated.

12. A U-turn indicator for motor vehicles, comprising:
    light fixture housing; and
    a plurality of light sources which are located in the light fixture housing, which housing is divided into a U-turn indicating region and a non-U turn indicating region, wherein the plurality of light sources located in the U-turn indicating region are lightable separately from the plurality of light sources in the non-U turn indicating region, and wherein the light sources in the U-turn indicating group have one color when functioning for U-turn indicating, and a different color, which is the same as the light sources in the non U-turn indicating group, when the light sources in the U-turn indicating group are functioning as turn signal indicator light sources.

13. The U-turn indicator of claim 12, further comprising separators for the plurality of light sources in the U-turn indicating group and the plurality of light sources in non-U turn indicating group.

14. The U-turn indicator of claim 13, wherein the separators comprise walls which define a desired outline.

15. The U-turn indicator of claim 12, wherein the plurality of light sources in the U-turn indicating group at least one of flash, pulsate, and sequentially light up to imply movement.

16. A U-turn indicator for motor vehicles, comprising:
light fixture housing; and
a plurality of light sources which are located in the light fixture housing, which housing is divided into a U-turn indicating region and a non-U turn indicating region, wherein the plurality of light sources located in the U-turn indicating region are lightable separately from the plurality of light sources in the non-U turn indicating region, wherein the light fixture housing comprises a light fixture housing for one of a left and right turn signal indicator on a front and rear of a automobile, and wherein the light fixture functions as one of a left and right turn signal indicator when the plurality of light sources in both the U-turn indicating region and the non-U turn indicating region are activated, and as a U turn indicator when only the plurality of light sources in the U-turn indicating region are activated.

17. A U-turn indicator for motor vehicles, comprising:
light fixture housing;
a plurality of light sources which are located in the light fixture housing, which housing is divided into a U-turn indicating region and a non-U turn indicating region, wherein some of the plurality of light sources are located in the U-turn indicating region and some of the plurality of light sources are located in the non-U turn indicating region; and
a layer which is located above at least the lights in the non-U-turn indicating region, which layer is in a state of being generally non-light translucent when the light fixture is utilized as a U-turn indicator and is in a state of being generally light translucent when being used for other purposes.

18. The U-turn indicator for motor vehicles of claim 17, wherein the other purposes comprise one of use as conventional turn signal indicators and brake lights.

* * * * *